(12) United States Patent
Dionne et al.

(10) Patent No.: US 10,489,956 B2
(45) Date of Patent: Nov. 26, 2019

(54) ROBUST ATTRIBUTE TRANSFER FOR CHARACTER ANIMATION

(71) Applicant: AUTODESK, INC., San Rafael, CA (US)

(72) Inventors: Olivier Dionne, Dollard-des-Ormeaux (CA); Martin De Lasa, Toronto (CA); Srinivasan Ramachandran, San Rafael, CA (US); Sahel Fallhdoust, San Rafael, CA (US); Eric Paquette, San Rafael, CA (US); Donya Ghafourzadeh, San Rafael, CA (US); Quentin Avril, San Rafael, CA (US)

(73) Assignee: AUTODESK, INC., San Rafael, CA (US)

( * ) Notice: Subject to any disclaimer, the term of this patent is extended or adjusted under 35 U.S.C. 154(b) by 32 days.

(21) Appl. No.: 14/999,985

(22) Filed: Jul. 21, 2016

(65) Prior Publication Data
US 2017/0032560 A1 Feb. 2, 2017

Related U.S. Application Data

(60) Provisional application No. 62/197,483, filed on Jul. 27, 2015.

(51) Int. Cl.
*G06T 13/40* (2011.01)
*G06T 17/20* (2006.01)
*G06T 19/20* (2011.01)

(52) U.S. Cl.
CPC .............. *G06T 13/40* (2013.01); *G06T 17/20* (2013.01); *G06T 19/20* (2013.01); *G06T 2219/2016* (2013.01)

(58) Field of Classification Search
CPC ..... G06T 13/40; G06T 13/20; G06T 2210/44; G06T 2207/20044; G06K 2209/055
See application file for complete search history.

(56) References Cited

U.S. PATENT DOCUMENTS 9,342,912 B1 * 5/2016 Pighin ..................... G06T 13/40
2006/0170677 A1 * 8/2006 Zhao ..................... G06T 3/0093
345/423

(Continued)

OTHER PUBLICATIONS

Chen et al., Character animation creation using hand-drawn sketches, Visual Comput (2005) 21: 551-558.*

(Continued)

*Primary Examiner* — Haixia Du
(74) *Attorney, Agent, or Firm* — Artegis Law Group, LLP

(57) ABSTRACT

One embodiment of the invention disclosed herein provides techniques for transferring attributes from a source animated character to a target character. A character attribute transfer system identifies a first set of markers corresponding to the source animated character. The character attribute transfer system identifies a second set of markers corresponding to the target character. The character attribute transfer system generates a geometric correspondence between the source animated character and the target character based on the first set of markers and the second set of markers independent of differences in geometry between the source animated character and the target character. The character attribute transfer system transfers a first attribute from the source animated character to the target character based on the geometric correspondence.

20 Claims, 6 Drawing Sheets
(3 of 6 Drawing Sheet(s) Filed in Color)

(56) References Cited

U.S. PATENT DOCUMENTS

| | | | |
|---|---|---|---|
| 2008/0024487 A1 | 1/2008 | Isner et al. | |
| 2008/0231640 A1* | 9/2008 | Pighin | G06T 3/0093 345/619 |
| 2009/0213138 A1* | 8/2009 | DeRose | G06T 13/00 345/619 |
| 2010/0053186 A1* | 3/2010 | DeRose | G06T 19/00 345/581 |
| 2011/0304622 A1* | 12/2011 | Rogers | G06T 13/40 345/420 |
| 2012/0019517 A1 | 1/2012 | Corazza et al. | |
| 2014/0267306 A1 | 9/2014 | Koniaris et al. | |
| 2015/0145859 A1 | 5/2015 | Corazza et al. | |
| 2015/0356767 A1* | 12/2015 | Suma | G06T 15/005 345/419 |
| 2016/0335793 A1* | 11/2016 | Rose | G06T 13/40 |

OTHER PUBLICATIONS

Schneider et al., Bijective Composite Mean Value Mappings, Eurographics Symposium on Geometry Processing 2013, 10 pages.*

Aigerman, N., Poranne, R., and Lipman, Y. 2014. "Lifted bijections for low distortion surface mappings." ACM Trans. Graph. 33, 4, 69.

Allen, Brett, Brian Curless, and Zoran Popovit. "The space of human body shapes: reconstruction and parameterization from range scans." In ACM transactions on graphics (TOG), vol. 22, No. 3, pp. 587-594. ACM, 2003.

Au, O. K. C., Tai, C. L., Chu, H. K., Cohen-Or, D., & Lee, T. Y. (2008). Skeleton extraction by mesh contraction. ACM Transactions on Graphics (TOG), 27(3), 44.

Baran, Ilya, and Jovan Popovio. "Automatic rigging and animation of 3d characters." in ACM Transactions on Graphics (TOG), vol. 26, No. 3, p. 72. ACM, 2007.

Borosán, Peter, Ming Jin, Doug DeCarlo, Yotam Gingold, and Andrew Nealen. "Rigmesh: automatic rigging for part-based shape modeling and deformation." ACM Transactions on Graphics (TOG) 31, No. 6 (2012): 198.

Bregler, Christoph, Lorie Loeb, Erika Chuang, and Hrishi Deshpande. "Turning to the masters: motion capturing cartoons." In ACM Transactions on Graphics (TOG), vol. 21, No. 3, pp. 399-407. ACM, 2002.

Bronstein, Alexander M., Michael M. Bronstein, and Ron Kimmel. "Generalized multidimensional scaling: a framework for isometry-invariant partial surface matching." Proceedings of the National Academy of Sciences 103, No. 5 (2006): 1168-1172.

Chang, Yen-Tuo, Bing-Yu Chen, Wan-Chi Luo, and Jian-Bin Huang. "Skeleton-driven animation transfer based on consistent volume parameterization." In Advances in Computer Graphics, pp. 78-89. Springer Berlin Heidelberg, 2006.

Chen, Cheng-Hao, I-Chen Lin, Ming-Han Tsai, and Pin-Hua Lu. "Lattice-based skinning and deformation for real-time skeleton-driven animation." In Computer-Aided Design and Computer Graphics (CAD/Graphics), 2011 12th International Conference on, pp. 306-312. IEEE, 2011.

De Aguiar, Edilson, Christian Theobalt, Sebastian Thrun, and Hans-Peter Seidel. "Automatic Conversion of Mesh Animations into Skeleton-based Animations." In Computer Graphics Forum, vol. 27, No. 2, pp. 389-397. Blackwell Publishing Ltd, 2008.

Dicko, A. H., Liu, T., Gilles, B., Kavan, L., Faure, F., Palombi, O., and Cani, M.-P. 2013. Anatomy Transfer. ACM Trans. Graph. 32, 6.

He, Ying, Xian Xiao, and Hock-Soon Seah. "Harmonic 1-form based skeleton extraction from examples." Graphical Models 71, No. 2 (2009): 49-62.

Jacobson, Alec, Ilya Baran, Jovan Popovic, and Olga Sorkine. "Bounded biharmonic weights for real-time deformation." ACM Trans. Graph. 30, No. 4 (2011): 78.

Jacobson, Alec. "Part II: Automatic Skinning via Constrained Energy Optimization." SIGGRAPH Course (2014): 1-28.

Kavan, Ladislav, Steven Collins, Jiří Žára, and Carol O'Sullivan. "Geometric skinning with approximate dual quaternion blending." ACM Transactions on Graphics (TOG) 27, No. 4 (2008): 105.

Kim, Vladimir G., Yaron Lipman, Xiaobai Chen, and Thomas Funkhouser. "Möbius transformations for global intrinsic symmetry analysis." In Computer Graphics Forum, vol. 29, No. 5, pp. 1689-1700. Blackwell Publishing Ltd, 2010.

Kim, Vladimir G., Yaron Lipman, and Thomas Funkhouser. "Blended intrinsic maps." In ACM Transactions on Graphics (TOG), vol. 30, No. 4, p. 79. ACM, 2011.

Kraevoy, Vladislav, and Alla Sheffer. "Cross-parameterization and compatible remeshing of 3D models." In ACM Transactions on Graphics (TOG), vol. 23, No. 3, pp. 861-869. ACM, 2004.

Le, Binh Huy, and Zhigang Deng. "Smooth skinning decomposition with rigid bones." ACM Transactions on Graphics (TOG) 31, No. 6 (2012): 199.

Le, Binh Huy, and Zhigang Deng. "Robust and accurate skeletal rigging from mesh sequences." ACM Transactions on Graphics (TOG) 33, No. 4 (2014): 84.

Li, Jituo, and Guodong Lu. "Skeleton driven animation based on implicit skinning." Computers & Graphics 35, No. 5 (2011): 945-954.

Lipman, Yaron, and Thomas Funkhouser. "Mobius voting for surface correspondence." In ACM Transactions on Graphics (TOG), vol. 28, No. 3, p. 72. ACM, 2009.

Miller, Christian, Okan Arikan, and Don Fussell. "Frankenrigs: building character rigs from multiple sources." In Proceedings of the 2010 ACM SIGGRAPH symposium on Interactive 3D Graphics and Games, pp. 31-38. ACM, 2010.

Orvalho, Verönica, Pedro Basics, Frederic I. Parke, Bruno Oliveira, and Xenxo Alvarez. "A Facial Rigging Survey." In Eurographics (STARs), pp. 183-204. 2012.

Ovsjanikov, Maks, Quentin Mérigot, Facundo Mémoli, and Leonidas Guibas. "One point isometric matching with the heat kernel." In Computer Graphics Forum, vol. 29, No. 5, pp. 1555-1564. Blackwell Publishing Ltd, 2010.

Ovsjanikov, Maks, Mirela Ben-Chen, Justin Solomon, Adrian Butscher, and Leonidas Guibas. "Functional maps: a flexible representation of maps between shapes." ACM Transactions on Graphics (TOG) 31, No. 4 (2012): 30.

Poirier, Martin, and Eric Paquette. "Methods for fast skeleton sketching." In SIGGRAPH 2009: Talks, p. 54. ACM, 2009.

Poirier, Martin, and Eric Paquette. "Rig retargeting for 3d animation." In Proceedings of Graphics Interface 2009, pp. 103-110. Canadian Information Processing Society, 2009.

Sumner, Robert W., and Jovan Popović. "Deformation transfer for triangle meshes." ACM Transactions on Graphics (TOG) 23, No. 3 (2004): 399-405.

Umeyama, Shinji. "Least-squares estimation of transformation parameters between two point patterns." IEEE Transactions on pattern analysis and machine intelligence 13, No. 4 (1991): 376-380.

Vaillant, Rodolphe, Loïc Barthe, Gaël Guennebaud, Marie-Paule Cani, Damien Rohmer, Brian Wyvill, Olivier Gourmel, and Mathias Paulin. "Implicit skinning: real-time skin deformation with contact modeling." ACM Transactions on Graphics (TOG) 32, No. 4 (2013): 125.

Van Kaick, Oliver, Hao Zhang, Ghassan Hamarneh, and Daniel Cohen-Or. "A survey on shape correspondence." In Computer Graphics Forum, vol. 30, No. 6, pp. 1681-1707. Blackwell Publishing Ltd, 2011.

Wang, Xiaohuan Corina, and Cary Phillips. "Multi-weight enveloping: least-squares approximation techniques for skin animation." In Proceedings of the 2002 ACM SIGGRAPH/Eurographics symposium on Computer animation, pp. 129-138. ACM, 2002.

Wareham, Rich, and Joan Lasenby. "Bone glow: An improved method for the assignment of weights for mesh deformation." In International Conference on Articulated Motion and Deformable Objects, pp. 63-71. Springer Berlin Heidelberg, 2008.

Zell, Eduard, and Mario Botsch. "ElastiFace: matching and blending textured faces." In Proceedings of the Symposium on Non-Photorealistic Animation and Rendering, pp. 15-24. ACM, 2013.

Zhou, Kun, Jin Huang, John Snyder, Xinguo Liu, Hujun Bao, Baining Guo, and Heung-Yeung Shum. "Large mesh deformation

(56) References Cited

OTHER PUBLICATIONS using the volumetric graph laplacian." In ACM transactions on graphics (TOG), vol. 24, No. 3, pp. 496-503. ACM, 2005.
International Search Report for Application No. PCT/US2016/044340, dated Oct. 12, 2016, 9 pages.
Sumner. "Mesh Modification Using Deformation Gradients." Department of Electrical and Computer Engineer, Massachusetts Institute of Technology, Dec. 15, 2005 pp. 1-131. [retrieved on Sep. 20, 2016). Retrieved from the Internet: <UKL:http://people.csail.mit.edu/sumner/thesis/Sumner2005MMU.pdf>.
Extended European Search Report for application No. 16831323.7 dated Dec. 19, 2018.

* cited by examiner

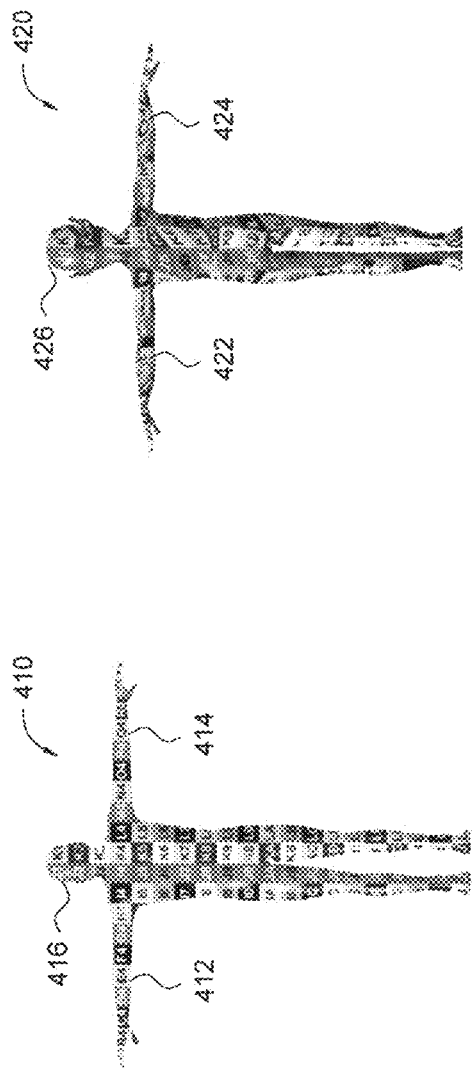
Figure 4A
Figure 4B
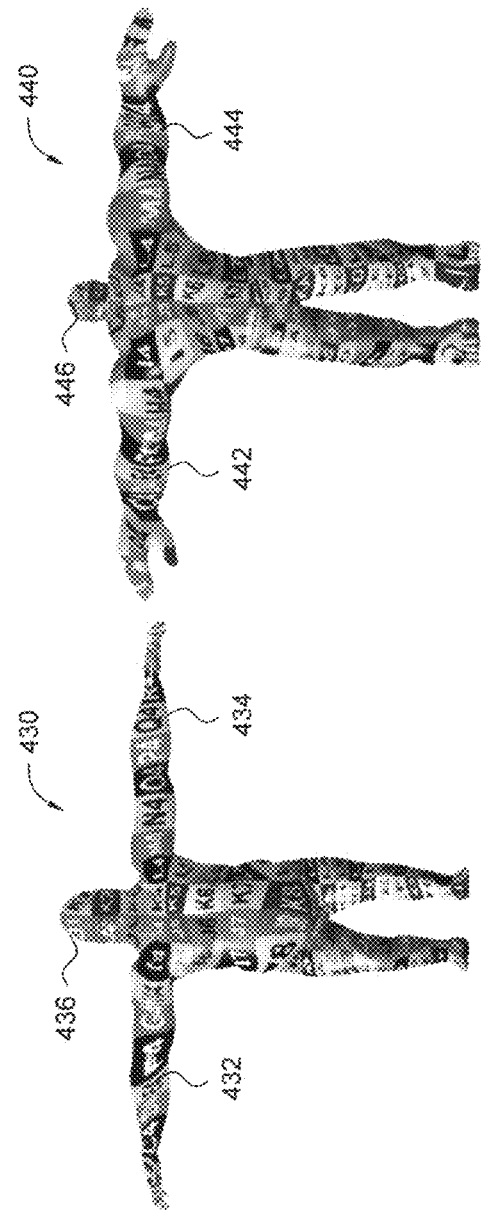
Figure 4C
Figure 4D

ROBUST ATTRIBUTE TRANSFER FOR CHARACTER ANIMATION

CROSS-REFERENCE TO RELATED APPLICATIONS

This application claims the benefit of U.S. provisional patent application titled, "ROBUST ATTRIBUTE TRANSFER FOR CHARACTER ANIMATION," filed on Jul. 27, 2015 and having Ser. No. 62/197,483. The subject matter of this related application is hereby incorporated herein by reference.

BACKGROUND OF THE INVENTION

Field of the Invention

The present invention relates generally to three-dimensional (3D) computer graphics and, more specifically, to robust attribute transfer for character animation.

Description of the Related Art

Among other things, computer animation involves designing and creating animated characters for use in various computer games and films. Typically, each animated character includes a joint hierarchy, a geometric object, and a set of controllers and constraints that define the rig of the character. The joint hierarchy, also referred to herein as a "skeleton," defines the bones and related structure of the animated character and how the bones are connected to one another. The geometric object defines the skin of the character and gives the animated character a unique appearance. Typically, the geometric object consists of a 3D mesh of geometry primitives, such as triangles, although other types of geometric objects can be specified. Accordingly, the geometric object is also referred to herein as a "mesh representation." The rig allows an animator to pose and move the character during animation. The animated character also includes skinning weights that define how the geometric object corresponding to the skin of the character is bound to or attaches to the rig. To create multiple characters for a game or film, computer animation artists create a joint hierarchy, geometric object, rig, and skinning weights separately for each separate animated character.

One drawback to the above approach is that generating animated characters for any given application, such as a game or a film, is time consuming and tedious because each character has to be designed separately. This problem is substantially exacerbated in applications involving hundreds or thousands of different characters. For example, to create a crowd of one hundred animated characters, a computer animation artist would have to create a separate joint hierarchy, geometric object, rig, and set of skinning weights for each of the one hundred animated characters. Again, such manual techniques are both time consuming and tedious, resulting in increased costs and delays.

One potential solution is to create a common geometric object used by each character, sculpted to have a unique appearance, and to apply the same common joint hierarchy, rig, and set of skinning weights across the different sculpted geometric objects. Such an approach could be more efficient in that the computer animation artist would not need to create a unique joint hierarchy, rig, and set of skinning weights for each separate character. However, such an approach arguably restricts the geometric object to be of the same topology for all characters. Otherwise, the common joint hierarchy, rig, and set of skinning weights being applied across the geometric objects would not "fit" properly. With these limitations, computer animation artists would be constrained in generating desired appearances for the animation characters being designed, which would hinder overall artistic freedom and reduce the overall visual quality of applications.

As the foregoing illustrates, what is needed in the art are more effective ways to design animated characters.

SUMMARY OF THE INVENTION

Various embodiments of the present application set forth a method for transferring characteristics from a source animated character to a target character. The method includes identifying a first set of markers corresponding to the source animated character. The method includes identifying a second set of markers corresponding to the target character. The method further includes generating a geometric correspondence between the source animated character and the target character based on the first set of markers and the second set of markers independent of differences in geometry between the source animated character and the target character. The method further includes transferring a first characteristic from the source animated character to the target character based on the geometric correspondence.

Other embodiments of the present invention include, without limitation, a computer-readable medium including instructions for performing one or more aspects of the disclosed techniques as well as a computing device for performing one or more aspects of the disclosed techniques.

At least one advantage of the disclosed techniques is that new animated characters can be created from a mesh representation without the need to create a custom joint hierarchy, rig, and set of skinning weights for the new animated character. The joint hierarchy, rig, and set of skinning weights from an existing animated character to the new animated character without placing constraints on the design of the mesh representation of the new animated character. The time and effort to generate a new animated character is reduced relative to prior approaches, and the computer animation artist can design the appearance of the new animated character without undue limits on artistic freedom.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4D illustrate a geometric correspondence mapping between a source animated character and multiple target characters, according to various embodiments of the present invention;

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Hardware Overview

Figure 1:
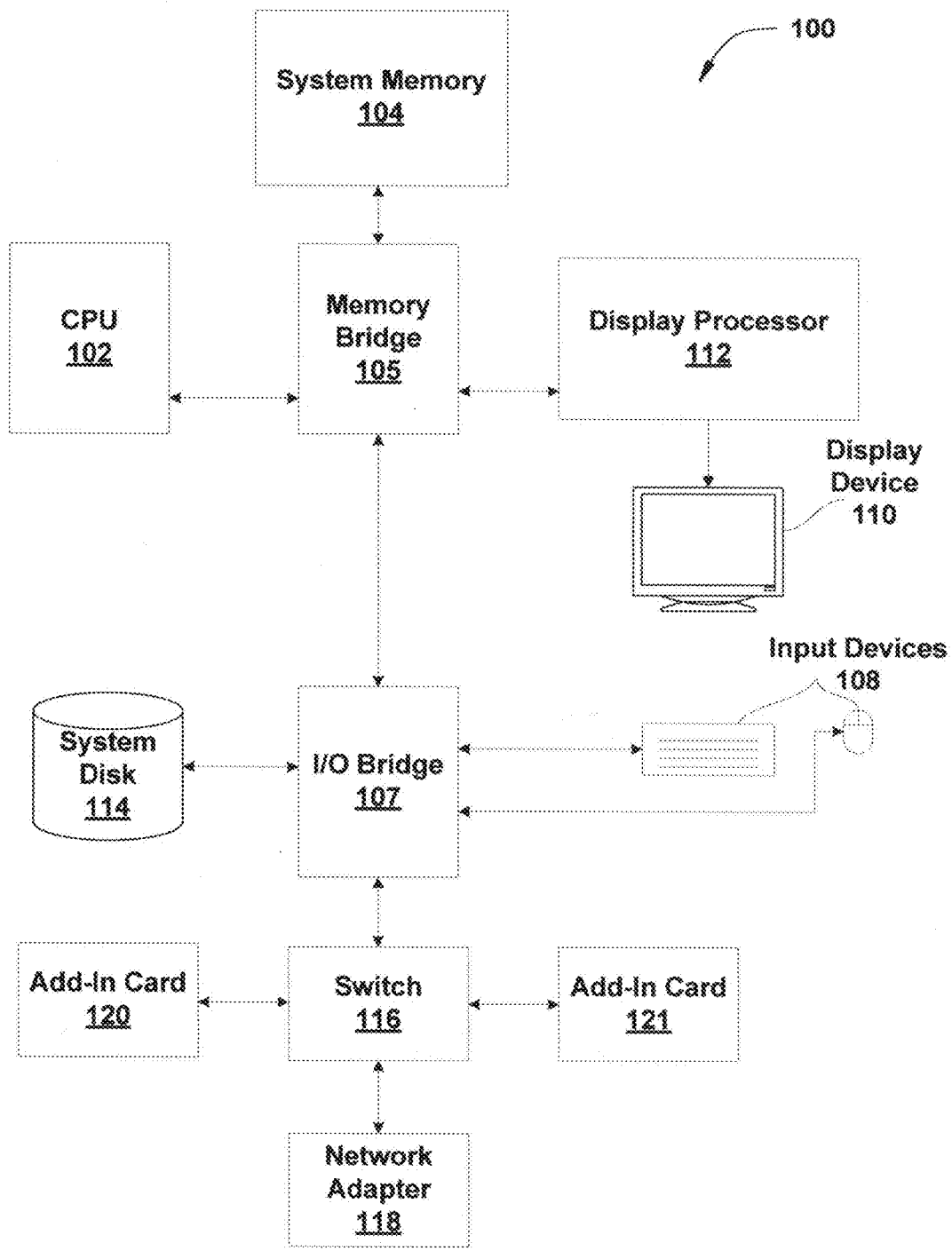
FIG. 1 illustrates a computing system configured to implement one or more aspects of the present invention.

FIG. 1 illustrates a computing system 100 configured to implement one or more aspects of the present invention. This figure in no way limits or is intended to limit the scope of the present invention. Computing system 100 may be a personal computer, video game console, personal digital assistant, mobile phone, mobile device, or any other device suitable for implementing one or more aspects of the present invention.

As shown, computing system 100 includes, without limitation, a processor 102, display processor 112, input/output (I/O) bridge 107, and system memory 104, coupled together and communicating via a bus path that may include a memory bridge 105. Processor 102 may be any technically feasible form of processing device configured to process data and execute program code. Processor 102 could be, for example, a central processing unit (CPU), a graphics processing unit (GPU), an application-specific integrated circuit (ASIC), a field-programmable gate array (FPGA), and so forth. Likewise, display processor 112 may be any technically feasible form of processing device configured to process data and execute program code. Display processor 112 could be, for example, a central processing unit (CPU), a graphics processing unit (GPU), an application-specific integrated circuit (ASIC), a field-programmable gate array (FPGA), and so forth.

Processor 102 and display processor 112 include one or more processing cores. In operation, one or both of processor 102 and display processor 112 is the master processor of computing system 100, controlling and coordinating operations of other system components. System memory 104 stores software applications and data for use by processor 102. Either or both of processor 102 and display processor 112 execute software applications stored within system memory 104 and optionally an operating system. In particular, either or both of processor 102 and display processor 112 executes software and then performs one or more of the functions and operations set forth in the present application. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to processor 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by processor 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by processor 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, processor 102, and I/O bridge 107 to form a system on chip (SoC). In still further embodiments, display processor 112 is omitted and software executed by processor 102 performs the functions of display processor 112.

Pixel data can be provided to display processor 112 directly from processor 102. In some embodiments of the present invention, instructions and/or data representing a scene are provided to a render farm or a set of server computers, each similar to computing system 100, via network adapter 118 or system disk 114. The render farm generates one or more rendered images of the scene using the provided instructions and/or data. These rendered images may be stored on computer-readable media in a digital format and optionally returned to computing system 100 for display. Similarly, stereo image pairs processed by display processor 112 may be output to other systems for display, stored in system disk 114, or stored on computer-readable media in a digital format.

Alternatively, processor 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

Processor 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to processor 102 directly rather than through a bridge, and other devices communicate with system memory 104 via memory bridge 105 and processor 102. In other alternative topologies display processor 112 is connected to I/O bridge 107 or directly to processor 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Robust Attribute Transfer for Character Animation

Figure 2:
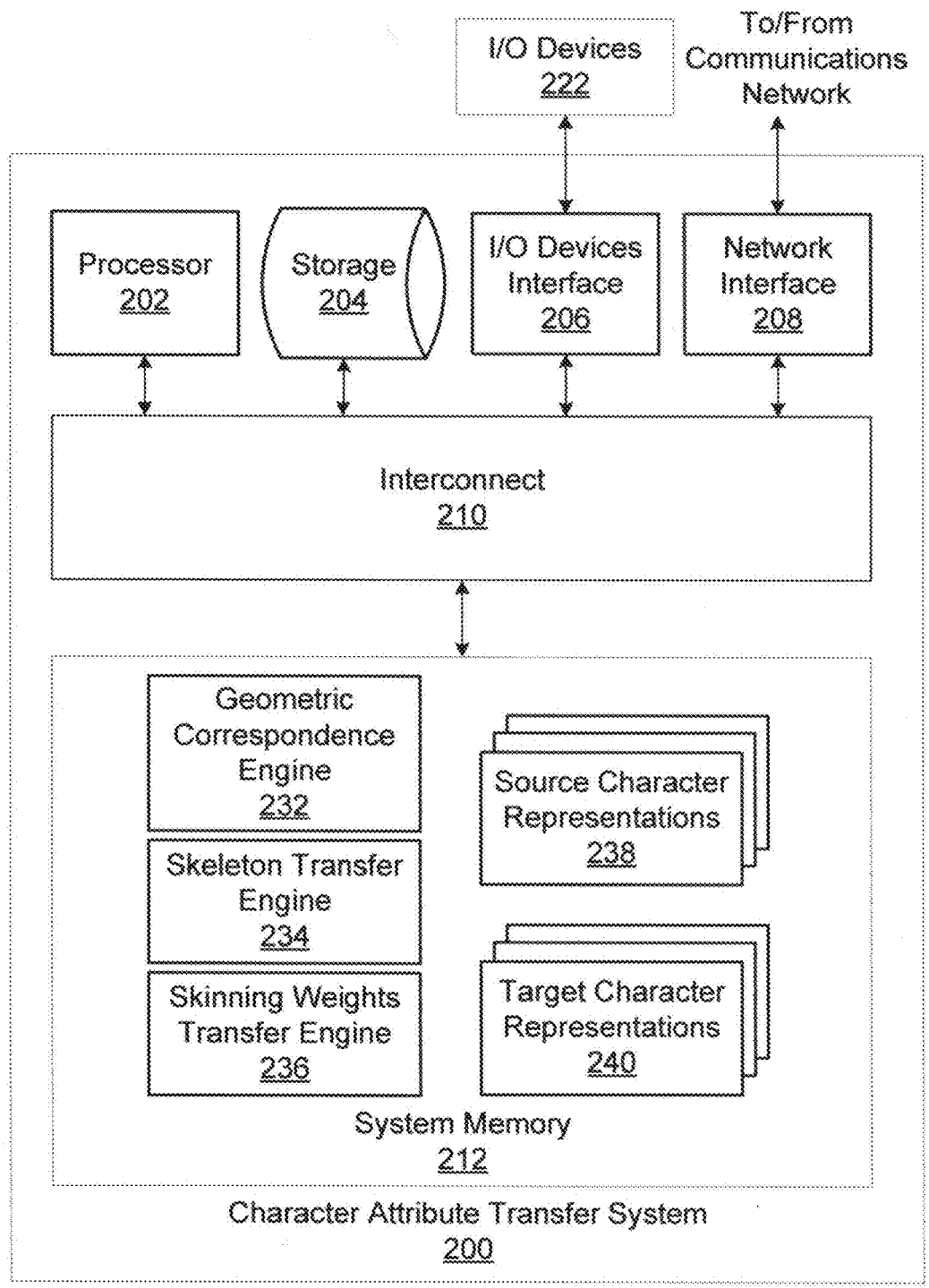
FIG. 2 is a block diagram of a character attribute transfer system that may be implemented via the computing system of FIG. 1, according to various embodiments of the present invention.

FIG. 2 is a block diagram of a character attribute transfer system 200 that may be implemented via the computing system 100 of FIG. 1, according to various embodiments of the present invention. In some embodiments, at least a portion of the character attribute transfer system 200 may be implemented via the computing system 100 of FIG. 1. As shown, the character attribute transfer system 200 includes, without limitation, a central processing unit (CPU) 202, storage 204, an input/output (I/O) devices interface 206, a network interface 208, an interconnect 210, and a system memory 212. The computing system 100 of FIG. 1 can be configured to implement the character attribute transfer system 200. The processor 202, storage 204, I/O devices interface 206, network interface 208, interconnect 210, and system memory 212 function substantially the same as described in conjunction with FIG. 1 except as further described below.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further includes a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems, via network interface 208, where network interface 208 is configured to transmit and receive data via a communications network.

The system memory 212 includes, without limitation, a geometric correspondence engine 232, a skeleton transfer engine 234, a skinning weights transfer engine 236, source character representations 238, and target character representations 240.

The geometric correspondence engine 232 establishes the geometric correspondence between a mesh representation of a source animated character and a mesh representation of a target character. The geometric correspondence engine 232 establishes this geometric correspondence by generating a mapping between a set of markers on the source animated character and a set of markers on the source animated character. The geometric correspondence is generated independent of differences in geometry and geometric details between the source and target mesh representations of the source animated character and the target character, respectively. More specifically, the correspondence is generated independent of differences of geometric details such as the number of geometry primitives in each mesh representation or how the mesh representation has been divided into geometry primitives. The geometry primitives of a mesh representation are also referred to herein as faces.

Each source animated character is represented as $C_S=(M_S, R_S, W_S)$, where $C_S$ is the source character representation 238, $M_S$ is the source mesh representation, $R_S$ is the source joint hierarchy, or skeleton, and $W_S$ is the set of source skinning weights that bind or attach the mesh representation to the joint hierarchy. Similarly, each target character is represented as $C_T=(M_T, R_T, W_T)$, where $C_T$ is the target character representation 240, $M_T$ is the target mesh representation, $R_T$ is the target joint hierarchy, or skeleton, and $W_T$ is the set of target skinning weights that bind or attach the mesh representation to the joint hierarchy. Using this nomenclature, the geometric correspondence engine 232 establishes the geometric correspondence between the source mesh representation $M_S$ and the target mesh representation $M_T$. Once geometric correspondence is established between the source mesh representation $M_S$ and the target mesh representation $M_T$, the source animated character $C_S$ can populate the target joint hierarchy $R_T$ and the set of target skinning weights $W_T$ based on the source joint hierarchy $R_S$ and set of source skinning weights $W_S$, respectively.

The geometric correspondence engine 232 determines the point-to-point correspondence between $M_S$ and $M_T$, linking together points with similar semantic meanings, such as the tip of the right finger and the top of the head. The geometric correspondence engine 232 produces a geometric correspondence at a desired level of smoothness and has the property of bijection. Bijection is a one-to-one correspondence between the elements of two sets, where every element of one set is paired with exactly one element of the other set, and every element of the other set is paired with exactly one element of the first set, and there are no unpaired elements.

The geometric correspondence engine 232 computes a dense correspondence from a set of markers associated with the source target mesh representations, where either or both of the mesh representations may be non-isometric. The geometric correspondence engine 232 performs a three-step process: (1) identifying markers on the source mesh representation $M_S$ and the target mesh representation $M_T$; (2) deforming the source mesh representation $M_S$ so that the source mesh representation $M_S$ matches the target mesh representation $M_T$; and (3) extracting the dense geometric correspondence based on closest locations between the deformed source mesh representation $M_S$ and the target mesh representation $M_T$.

In the first step, the geometric correspondence engine 232 identifies the markers that are placed on the source mesh representation $M_S$ and the target mesh representation $M_T$. The markers may be manually placed or otherwise specified by a user or, in the alternative, produced via an automated process. Areas of the mesh representation exhibiting a high level detail, such as the hands and feet, may have a higher density of marker placement relative to areas of the mesh representation exhibiting a lower level of detail. In some embodiments, a set of approximately 325 markers produces a geometric correspondence model with an acceptable level of quality for transferring the skeleton and skinning weights.

In the second step the geometric correspondence engine 232 deforms the source mesh representation $M_S$ so that the source mesh representation $M_S$ matches the target mesh representation $M_T$. The geometric correspondence engine 232 performs a series of substeps to align, scale, and deform the source mesh representation $M_S$ so that the position, orientation, scale, and shape of the source mesh representation $M_S$ become similar to the position, orientation, scale, and shape, respectively, of the target mesh representation $M_T$. The geometric correspondence engine 232 performs energy minimizations computations based on marker positions, vertex Laplacian, and Voronoi areas. The geometric correspondence engine 232 computes per-vertex closest location between the deformed and the initial target mesh representations, while rejecting locations in the mesh representation that have inconsistent normal vectors. When computing the closest location for a specific vertex, the geometric correspondence engine 232 inspects the normal vectors of each candidate polygon. The geometric correspondence engine 232 rejects the candidate polygon if the angle with the vertex normal is greater than 90°. Because the Laplacian operator can severely distort the vertex and face normals, the geometric correspondence engine 232 relies on the input mesh normal to determine whether to reject polygons. As a result, this rejection test may improve the robustness of the geometric correspondence by reducing the likelihood of triangle flipping and self-intersecting geometry.

In the third step, after the source mesh representation $M_S$ has been deformed to match the target mesh representation $M_T$, the geometric correspondence engine 232 extracts the dense correspondence based on closest locations between the deformed source mesh representation $M_S$ and the target mesh representation $M_T$. In so doing, the geometric correspondence engine 232 rejects locations on the mesh representations associated with inconsistent normal vectors. In the resulting geometric correspondence, each vertex included in the deformed source is bijectively linked to a barycentric coordinate on a polygon of the target mesh representation $M_T$, and vice versa.

The skeleton transfer engine 234 calculates the target joint hierarchy $R_T$ via an optimization technique, while preserving the relationships between vertices in the source mesh representation $M_S$ and joints in the source joint hierarchy $R_S$. The skeleton transfer engine 234 also performs a pose normalization procedure to ensure that joints in the target joint hierarchy $R_T$ and the source joint hierarchy $R_S$ are correctly aligned. After the geometric correspondence engine 232 computes the geometric correspondence between $M_S$ and $M_T$, the skeleton transfer engine 234 determines the position of the source skeleton $R_S$ within $M_T$. In so doing, the skeleton transfer engine 234 performs a two-step process by first positioning and then orienting joints, while considering the relationship among joints, vertices, and skinning weights.

In the first step, the skeleton transfer engine 234 transfers the joint positions from the source skeleton $R_S$ to the target skeleton $R_T$, while preserving the relationships found in the source character representation 238. The skeleton transfer engine 234 inspects the source skinning weights $W_S$ to extract the joint-vertices relationships. Typically, each joint or element of the source skeleton $R_S$ affects only a subset of the vertices included in the source mesh representation $M_S$. For example, the shoulder joint would affect a subset of the vertices near the shoulder, such as the vertices representing the arm, hand, and upper back. These vertices would be associated with non-zero skinning weights with respect to the shoulder joint. Other vertices that are not affected by the shoulder joint would be associated with zero skinning weights with respect to the shoulder joint.

With respect to a particular joint, the vertices associated with non-zero skinning weights $\{v_{iS}|w_{iS}>0\}$ are referred to herein as weighted vertices. The skeleton transfer engine 234 extracts the joint-vertices relationship from the source character representation 238 and then apply the joint-vertices relationship to the target character representation 240 to compute the new joint position in the target character. Considering a joint $j_S$ and the m weighted vertices $v_{iS}$ associated with the joint $j_S$, the joint positions are expressed as a linear combination of vertex positions, as given by Equation 1 below:

$$J_S = \sum_{i=1}^{m} c_i v_{iS} \quad (1)$$

Of all possible linear combinations of vertex positions, the skeleton transfer engine 234 selects the linear combination satisfying the following criteria: (1) the linear combination is very close to the joint position; (2) the value of each coefficient $c_i$ is proportional to the corresponding skinning weight; and (3) the sum of the coefficients $c_i$ is equal to 1. If these three criteria are satisfied, then the joint location is enclosed in the convex envelope of the weighted vertices and the vertices with larger weights are given more importance. To determine the coefficients $c_i$, the skeleton transfer engine 234 minimizes the energy function for each source joint $j_S$, as given by Equations 2a-2c below:

$$E(c_i, \ldots, c_m) = \omega_1 \left\| \left( \sum_{i=1}^{m} c_i v_{iS} \right) - J_S \right\|^2 \quad (2a)$$

$$+ \omega_2 \sum_{i=1}^{m} \left( c_i - \frac{w_{iS}}{\sum_{j=1}^{m} w_{jS}} \right)^2 \quad (2b)$$

$$+ \omega_3 \left( \left( \sum_{i=1}^{m} c_i \right) - 1 \right)^2 \quad (2c)$$

where $w_{iS}$ is the skinning weight of vertex $v_{iS}$ for joint $j_S$, and the parameters $\omega_1$, $\omega_2$, and $\omega_3$ adjust the influence of each part of the energy function. The first term (Equation 2a) minimizes the distance between the linear combination of the vertex positions and the joint position. Although the first term (Equation 2a) of the equation has the quality of yielding the joint position, Equation 2a may be under-constrained, resulting several combinations of vertex positions that may yield the same joint position. Further, the first term is likely to result in including vertices with low skinning weight values, which are typically farther from the joint and, correspondingly, of relatively low value.

To correct this issue, the skeleton transfer engine 234 computes a second term (Equation 2b) to ensure that each coefficient $c_i$ is proportional to the corresponding skinning weight $w_{iS}$. However, the magnitude of the second term (Equation 2b) may yield large errors for the first term (Equation 2a). In order to mitigate this issue, the skeleton transfer engine 234 sets $\omega_1 \gg \omega_2$, causing the first term (Equation 2a) to have a high absolute value relative to the second term (Equation 2b). Finally, the skeleton transfer engine 234 computes a third term (Equation 2c) to keep the joint within the convex envelope of the vertices, and, correspondingly, to penalize "out-of-the-mesh" joint positions. In some embodiments, a good balance among the three terms is achieved where $\omega_1=1,000$, $\omega_2=1$, and $\omega_3=10$. The energy function of Equations 2a-2c is quadratic, and the skeleton transfer engine 234 minimizes this energy function by solving the corresponding linear system. The skeleton transfer engine 234 then uses the resulting coefficients $c_i$ to determine the new target joint position $j_T$, as given by Equation 3 below:

$$J_T = \sum_{i=1}^{m} c_i \rho_{iT} \quad (3)$$

where $\rho_{iT}$ is the point on the target mesh representation corresponding to vertex $v_{iS}$ based on the geometric correspondence.

In some embodiments, after optimizing the joint positions, the skeleton transfer engine 234 may perform one or more post-process steps to further adjust joints to take advantage of straight abdomen and character symmetry. Animated characters are often created to have a relatively straight abdominal region and may exhibit bilateral, radial, or other forms of symmetry. The skeleton transfer engine 234 may perform spine alignment or mirroring with respect to a symmetry plane, such as a sagittal, or lateral, yz plane.

In a first technique, the skeleton transfer engine 234 may perform spine alignment to take advantage of a character that has a straight abdomen. The skeleton transfer engine 234 may employ a modified version of Equations 2a-2c, where all of the weighted vertices from the set of spine joints are considered. In such cases, the value m becomes the number of vertices with a non-zero weight for at least one spine joint. As different weights $w_{iS}$ exist for each joint of the spine, the second term (Equation 2b) is modified to compute the sum of the spine weights $w_{i\_sumS}$ rather than of $w_{iS}$. Similarly, the second term (Equation 2b) is modified to compute the sum of the spine weights $w_{j\_sumS}$) rather than of $w_{jS}$. The skeleton transfer engine 234 also updates the first term (Equation 2a) to compute only the x position shared by all of the spine joints, given as $(\Sigma_{i=1}^{m} c_i v_{ixS}) - j_{xS})^2$. The skeleton transfer engine 234 computes the x coordinate of the target spine as $j_{xT} = \Sigma_{i=1}^{m} c_i \rho_{ixT}$. The skeleton transfer engine 234 then updates the target spine joints x coordinates with the computed $j_{xT}$.

In a second technique, the skeleton transfer engine 234 may perform mirroring to take advantage of a character that exhibits some form of symmetry. In the case of bilateral symmetry, the skeleton transfer engine 234 may mirror all of the right joints to the left side of the skeleton, average the position of each symmetric joint pair, and mirror the average values back to the right side of the skeleton.

After completing the first step of positioning the joints, the skeleton transfer engine 234, in a second step, transfers the joint orientations and rotations from the source skeleton $R_S$ to the target skeleton $R_T$. The computation of the target joint positions enables the skeleton to be correctly embedded within the target mesh representation $M_T$. Nevertheless, the skeleton $R_S$ is not defined solely by joint positions. Joint orientations and rotations are also transferred to ensure that the skeletal structure is fully preserved and articulates correctly during animation. After a successful transfer, if each skeleton is in neutral pose, with all of its joint rotations set to zero, every joint of the source and the target should have the same orientation in both the local and global spaces. Correctly transferring joint orientations and rotations helps to ensure that animations from the source character will result in similar target character poses during animation.

The skeleton transfer engine 234 detects differences existed in limb orientation between the source skeleton $R_S$ and the target skeleton $R_T$. The skeleton transfer engine 234 computes the joint rotations that account for differences in joint orientation between the source skeleton $R_S$ and the target skeleton $R_T$. As with the joint positioning step, the skeleton transfer engine 234 relies on the source weighted vertices $\{v_{iS}|w_{iS}>0\}$ and corresponding locations $\{\rho_{iT}\}$, where each $v_{iS}$ is linked to a specific $\rho_{iT}$ by the geometric correspondence.

The skeleton transfer engine 234 processes the joints one at a time, starting from the root joint, transferring joint orientations and computing joint rotations according to the process shown in Listing 1 below:

```
Transfer_Joint(j_iS, j_iT, parentTransf)
1  j_iT.orient=j_iS.orient
2  {ρ_iT}=GeometricCoresp({v_iS|w(v_iS, j_iS)>0})
/* Take into account the rotations from parent joints */
3  {ρ_iT}=Rotate ({ρ_iT}; parentTransf)
4  globalRot=BestRot ({ρ_iT}, {v_iS|w(v_iS, j_iS)>0})
5  j_iT.Δrot=j_iS.globalToLocalMatrix*globalRot
/* Move to the next joints for both the source and target */
6  for each child_S∈(j_iS.children; child_T∈j_iT.children do
7    inverseRot=parentTransf*Rotation(-Δrot)
8    TransferJoint(child_S, child_T, inverseRot)
```

Listing 1

The skeleton transfer engine 234 directly copies the joint orientation of $j_{iT}$, the orientation in local space with respect to the parent joint, from $j_{iS}$ (Listing 1, line 1). For each joint, the skeleton transfer engine 234 determines the rotation needed to align $\{\rho_{iT}\}$ (Listing 1, line 2) onto $\{v_{iS}|w_{iS}>0\}$ using best-matching similarity rotation (Listing 1, line 4). The result is a rotation in global space, which the skeleton transfer engine 234 then converts to a Δrotation in the local space of the joint $j_{iT}$ (Listing 1, line 5). As the skeleton transfer engine 234 moves to the next joint, the skeleton transfer engine 234 rotates the points $\{\rho_{iT}\}$ based on the cumulative inverse Δrotations of the kinematic chain from the parent up to the root joint (Listing 1, lines 3 and 7). After recursively visiting each joint (Listing 1, lines 6-8), the skeleton transfer engine 234 copies the entire skeleton to the target character representation 240, with each joint repositioned and oriented. The skeleton transfer engine 234 extracts each joint Δrotation with respect to the source skeleton $R_S$. The target character is now ready for transfer of the source skinning weights $W_S$ to the target mesh representation $M_T$.

The skinning weights transfer engine 236 calculates the set of target skinning weights $W_T$ and binds or attaches the target mesh representation $M_T$ to the target joint hierarchy $R_T$, thereby yielding a target character that is ready for animation and that preserves quality of the source character representation $C_S$ 238. Skinning weights define how the mesh representation deforms and moves in response to changes in the skeleton and enable a character to animate based on the character's skeleton.

In some embodiments, each vertex included in the mesh representation is associated with a different skinning weight for each element of the skeleton. In such embodiments, if a mesh representation includes N vertices and a skeleton includes M elements, then the number of skinning weights may be N times M. In other embodiments, each vertex included in the mesh representation is associated with a set of skinning weights for a subset of the elements of the skeleton that are within a threshold distance from the vertex. In such embodiments, skinning weights would not be defined between the vertex and elements of the skeleton that are beyond the threshold distance from the vertex. In some embodiments, the skinning weights from the source animated character may be filtered based on the geometric correspondence and differences in mesh resolution between the source animated character and the target character.

The skinning weights transfer engine 236 obtains the target skinning weights $W_T$ based on the geometric correspondence from the target mesh representation $M_T$ to the source mesh representation $M_S$. For each target vertex $v_{iT}$, the corresponding location on the source mesh representation $M_S$ is defined as a barycentric coordinate and a triangle index.

If the source mesh representation $M_S$ and the target mesh representation $M_T$ have the same resolution, or if the source mesh representation $M_S$ has a coarser, or lower, resolution than the target mesh representation $M_T$, then the skinning weights transfer engine 236 performs a linear interpolation, or linear blending, to generate a set of resampled the source skinning weights $W_S$, and, in turn, to thereby generate the target skinning weights $W_S$. In such cases, the new target skinning weight for a vertex included in the target mesh representation $M_T$ is computed using the corresponding barycentric coordinates and triangle on the source mesh representation $M_S$, as given by Equation 4 below:

$$w_i^{blend} = \beta_a w_{aS} + \beta_b w_{bS} + \beta_c w_{cS} \qquad (4)$$

where a, b, and c correspond to the three vertices included in the source triangle, $w_{aS}$, $w_{bS}$, and $w_{cS}$ are the skinning weights of the vertices, and $\beta_a$, $\beta_b$, and $\beta_c$ are the barycentric coordinates of the vertices.

If the target mesh representation $M_T$ has a coarser, or lower, resolution than the source mesh representation $M_S$, then linear blending with barycentric coordinates may result in undersampling. In such cases, vertices and weight values from the source animated character may remain unused, leading to aliasing and artifacts in the skin deformation during animation. To detect when such aliasing is likely to occur, the skinning weights transfer engine 236 compares the size of corresponding polygons between the target mesh representation $M_T$ and the source mesh representation $M_S$. The skinning weights transfer engine 236 performs this comparison based on the re-scaling of the source mesh representation as $M_S$ to match the dimensions of the target mesh representation $M_T$ during the geometric correspondence process. In order to prevent aliasing and artifacts, the skinning weights transfer engine 236 selects vertices for skinning weights filtering according to the process shown in Listing 2 below:

```
1  VA^blend=β_a VA(v_aS)+β_b VA(v_bS)+β_c VA(v_cS)
2  if VA^blend<VA(v_iT) then
3    Sel={ }
4    Sum=VA^blend
5    Next=(v_aS, v_bS, v_cS)
6    VA_Next=Σ_{v_kS∈Next} VA(v_kS)
7    while Sum+VA_Next<VA(v_iT) do
8      Sel=Sel ∪ Next
9      Sum=Sum+VA_Next
10     Next=vertices from next ring of neighbors
11     VA_Next=Σ_{v_kS∈Next} VA(v_kS)
```

Listing 2

To detect vertices requiring additional filtering, the skinning weights transfer engine 236 computes and compares the Voronoi area of each target vertex $VA(v_{iT})$ with the corresponding blended Voronoi area of the source (Listing 2, lines 1 and 2). If $VA(v_{iT})$ is greater than $VA^{blend}$, then the skinning weights transfer engine 236 identifies the vertices from the next ring of neighboring vertices near the location of the geometric correspondence (Listing 2, lines 5 and 10). The skinning weights transfer engine 236 adds these vertices to the set of selected vertices (Listing 2, line 8) The skinning weights transfer engine 236 adds the corresponding Voronoi areas of the selected vertices (Listing 2, line 9), until adding the Voronoi areas of the next ring of neighboring vertices would result in a total Voronoi area larger than $VA(v_{iT})$ (Listing 2, line 7). The resulting Voronoi area is given by Equations 5a and 5b below:

$$VA^{blend} + \sum_{v_{jS} \in Sel} VA(v_{jS}) < VA(v_{iT}) \qquad (5a)$$

$$VA^{blend} + \sum_{v_{jS} \in Sel} VA(v_{jS}) + \sum_{v_{kS} \in Next} VA(v_{kS}) \geq VA(v_{iT}) \qquad (5b)$$

If a Voronoi area of exactly $A(v_{iT})$ is desired, the skinning weights transfer engine 236 computes a factored contribution of the vertices from the next ring of neighboring vertices that cause the Voronoi area to exceed $VA(v_{iT})$. The influence of this ring of neighboring vertices is, therefore, less than that of the previously selected vertices. The skinning weights transfer engine 236 combines the skinning weights with respect to the corresponding Voronoi areas, as given by Equations 6a-6c below:

$$w_{iT} VA(v_{iT}) = w_i^{blend} VA^{blend} \qquad (6a)$$

$$+ \sum_{v_{jS} \in Sel} w_S(v_{jS}) VA(v_{jS}) \qquad (6b)$$

$$+ \sum_{v_{kS} \in Next} w_S(v_{kS}) VA(v_{kS}) \left( \frac{VA(v_{iT}) - VA^{blend} - VA_{Sel}}{VA_{Next}} \right) \qquad (6c)$$

where $VA_{Sel} = \Sigma_{v_{jS} \in Sel} VA(v_{jS})$ and $VA_{Next} = \Sigma_{v_{ks} \in Next} VA(v_{kS})$. The skinning weights transfer engine 236 then divides the combination from the previous equation by $VA(v_{iT})$ to extract the skinning weight. By filtering the skinning weights, the resulting target skinning weights more faithfully match the source skinning weights. In addition, the resulting skinning weights may be more symmetric when filtering is applied. Considering a skeleton with n joints, every vertex stores n skinning weight values, with each weight describing the relationship between the transformation of the corresponding joint $j_l$ and the transformation of $v_{iT}$. To limit unwanted animation artifacts, the skinning weights transfer engine 236 normalizes the skinning weights, as given by Equation 7 below:

$$\sum_{l=1}^n w_{J_l} = 1 \qquad (7)$$

such that the sum of the skinning weights is equal to one. After the skinning weights are transferred, any technically feasible skinning method may be applied to bind or attach the target mesh representation $M_T$ to the target skeleton $R_T$, including, without limitation, linear blend skinning and dual quaternion skinning.

After the skeleton and skinning weights have been transferred to the target character, the skinning weights transfer engine 236 binds or attaches the target mesh representation $M_T$ to the transferred skeleton $R_T$ based on the transferred skinning weights $W_T$. The new target character $C_T$ is then ready for animation. In some embodiments, forward and inverse kinematics animation may be used to compute joint rotations, thereby obtaining similar animation results for the source animated character and target character.

In this section, we highlight several benefits of the proposed retargeting approach. First, we show how our approach can set the skeletons and meshes from all of the target characters in the same pose as the source. Second, we validate that the retargeting works on a wide range of characters with different morphologies and different mesh topologies. Lastly, we demonstrate that the work done by an artist, when positioning joints, painting weights, and designing a specific skeleton, is faithfully transferred to target characters.

In some embodiments, the target character may be set in the same pose as the source character based on the Δrotations computed during joint orientation and rotation. This operation is referred to herein as pose normalization. In such embodiments, the skeleton transfer engine 234 may visit each joint of the target skeleton $R_T$ and may invert the computed Δrotations so that the actual rotation of each of the joints of the target skeleton $R_T$ matches the corresponding rotation of the source skeleton $R_S$. This pose normalization technique works for characters with various morphological and topological characteristics. For example, a source skeleton of an average man with 52 joints could be locally fitted to multiple target skeletons from the hips and spine up to the head, fingers, and toes. The source skeleton could be successfully fitted to target skeletons that exhibit a wide variety of morphological characteristics, such as significant differences in hand size, limb size and length, abdominal size, neck size, or head size. The pose normalization technique works well with target characters ranging from low-resolution meshes, such as 2000 polygons, to high-resolution meshes, such as 50,000 polygons. Further, animated characters with incompatible mesh topologies are processed without any change to their respective mesh representations. Such flexibility may provide more freedom to artists because artists can transfer the skeleton and skinning weights among proxy characters, including low polygon count game characters and high polygon count visual effects characters without regard to the particulars of the corresponding mesh representations.

In some embodiments, the disclosed techniques work properly with meshes representations with different resolutions. For examples, a coarse resolution animated character could be retargeted to a finer resolution target mesh representation. Likewise, a high-resolution visual effects animated character could be retargeted to a low-resolution mesh representation for mobile game applications.

In some embodiments, the disclosed techniques may be employed to propagate post-transfer artistic changes made to the source animated character to the various target characters. A computer animation artist may make changes to the mesh representation of the source animated character. Via the enclosed techniques, the transfer process may be repeated in order to propagate the changes to the target characters. For example, to approximate the anatomical movement of the knee, a computer animation artist could place knee joints close to the surface of the mesh representation. Because rigging tools typically use the projected centering technique to set the joint on the medial axis, creating a skeleton from scratch for each target character would involve additional editing operations. The disclosed approach faithfully reproduces the work of the computer animation artist.

In some embodiments, the disclosed transfer approach also preserves details in manually painted skinning weights. Computer animation artists may rely on automatic binding or attaching methods to obtain initial skinning weights. However, existing binding and attaching methods have limitations and may display artifacts during animation. To limit such artifacts, manual post-corrections may be warranted. The disclosed approach propagates the manual corrections made to the source animated character to target mesh representations. Further, even if the skinning weights have already been transferred to the target characters, additional skinning weight corrections can also be transferred to target characters. This propagation of changes from source to target characters may be performed simultaneously on multiple target characters at interactive rates.

In some embodiments, the disclosed approach is not limited to a specific skeleton structure. This flexibility provides the freedom to design skeletons with greater or fewer joints and with a hierarchy suited to a specific animation. The spatial relationships between the joints and the mesh representations may be preserved through the transfer even when the source and target joint hierarchies differ in terms of the number of joints.

It will be appreciated that the system shown herein is illustrative and that variations and modifications are possible. For example, the present disclosure describes that, after determining the geometric correspondence between the source and target mesh representations, the skeleton and the skinning weights are transferred from the source animated character to the target character. The geometric correspondence could be used to transfer other attributes of the animated characters, including, without limitation, the rig control and (u, v) coordinates for applying textures to the animated characters. The rig control includes a set of controllers and constraints that define how an animated character can pose and move. The (u, v) coordinates define positions of one or more textures that are projected onto the mesh representation, where such textures enhance the outer appearance of the animated character.

Figure 3:
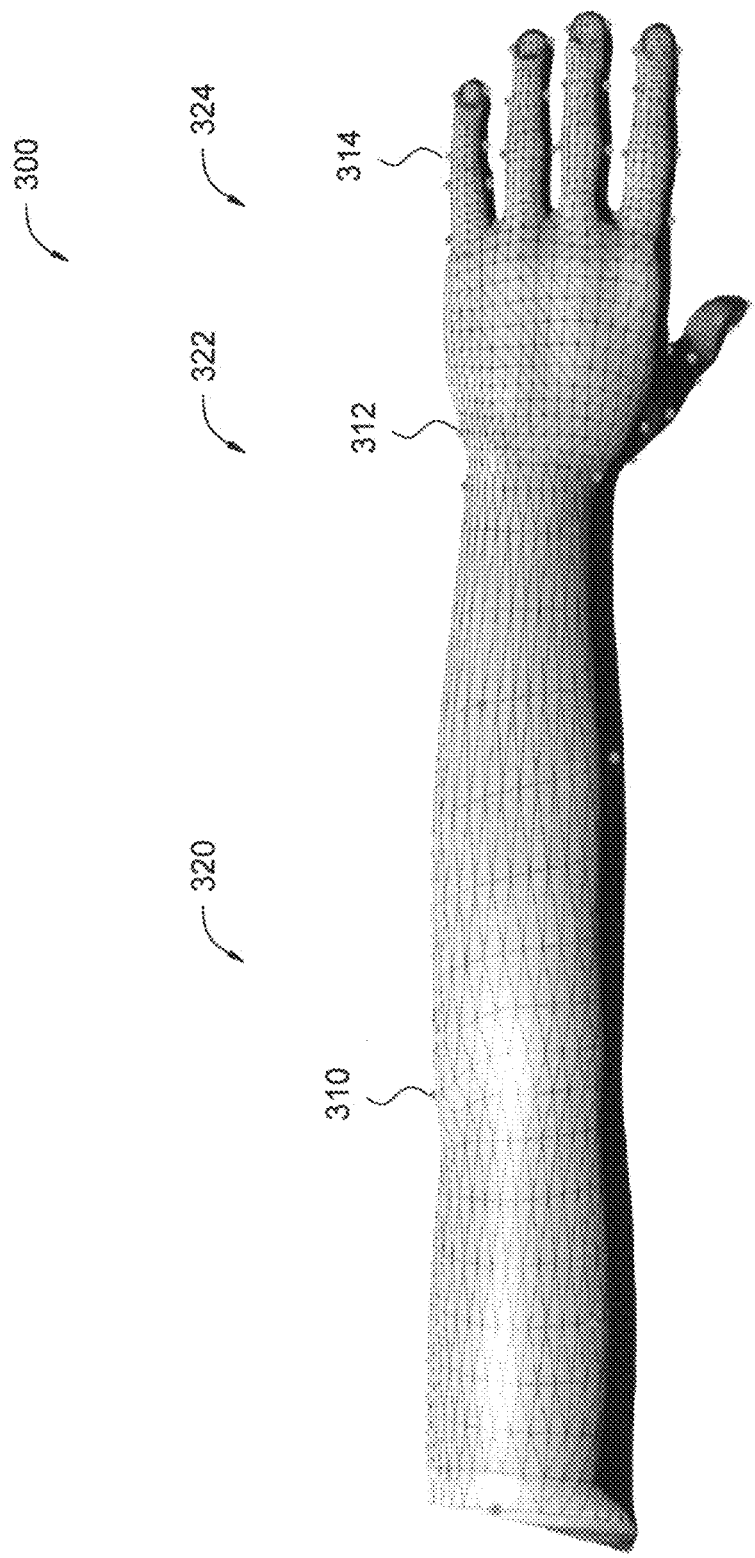
FIG. 3 illustrates a set of markers placed on a mesh representation, according to various embodiments of the present invention.

FIG. 3 illustrates a set of markers placed on a mesh representation 300, according to various embodiments of the present invention. As shown, a mesh representation 300 is populated with markers, such as marker 310, 312, and 314. The mesh representation includes an arm 320, wrist 322, and hand 324 of an animated character (not explicitly shown). The markers on the mesh representation 300 are placed at different densities depending on the complexity of movement and corresponding bone structure of the various components of the mesh representation 300. The bone structure and complexity of movement of the arm 320 is comparatively low. Therefore, the markers of the arm 320, such as marker 310, are placed with a relatively low density. By contrast, the bone structure and complexity of movement of the wrist 322 is moderate. Therefore, the markers of the wrist 322, such as marker 312, are placed with a medium density. Finally, the bone structure and complexity of movement of the hand 324 is comparatively high. Therefore, the markers of the hand 324, such as marker 314, are placed with a relatively high density.

FIGS. 4A-4D illustrate a geometric correspondence mapping between a source animated character 410 and multiple target characters 420, 430, and 440, according to various embodiments of the present invention. As shown, the source animated character 410 is divided into patches, such as patch 412, 414, and 416, where each patch includes a portion of the mesh representation of the source animated character 410. Likewise, target character 420 is divided into patches, such as patch 422, 424, and 426, target character 430 is divided into patches, such as patch 432, 434, and 436, and target character 440 is divided into patches, such as patch 442, 444, and 446. After the geometric correspondence is performed, the patches of the source animated character 410 is mapped to the patches of the target characters 420, 430, and 440. Patch 412 located along the left arm of the source animated character 410 maps to patches 422, 432, and 442 located along the left arm of target characters 420, 430, and 440, respectively. Similarly, patch 414 located along the right arm of the source animated character 410 maps to patches 424, 434, and 444 located along the right arm of target characters 420, 430, and 440, respectively. Finally, patch 416 located on the head of the source animated character 410 maps to patches 426, 436, and 446 located on the head of target characters 420, 430, and 440, respectively.

Figure 5:
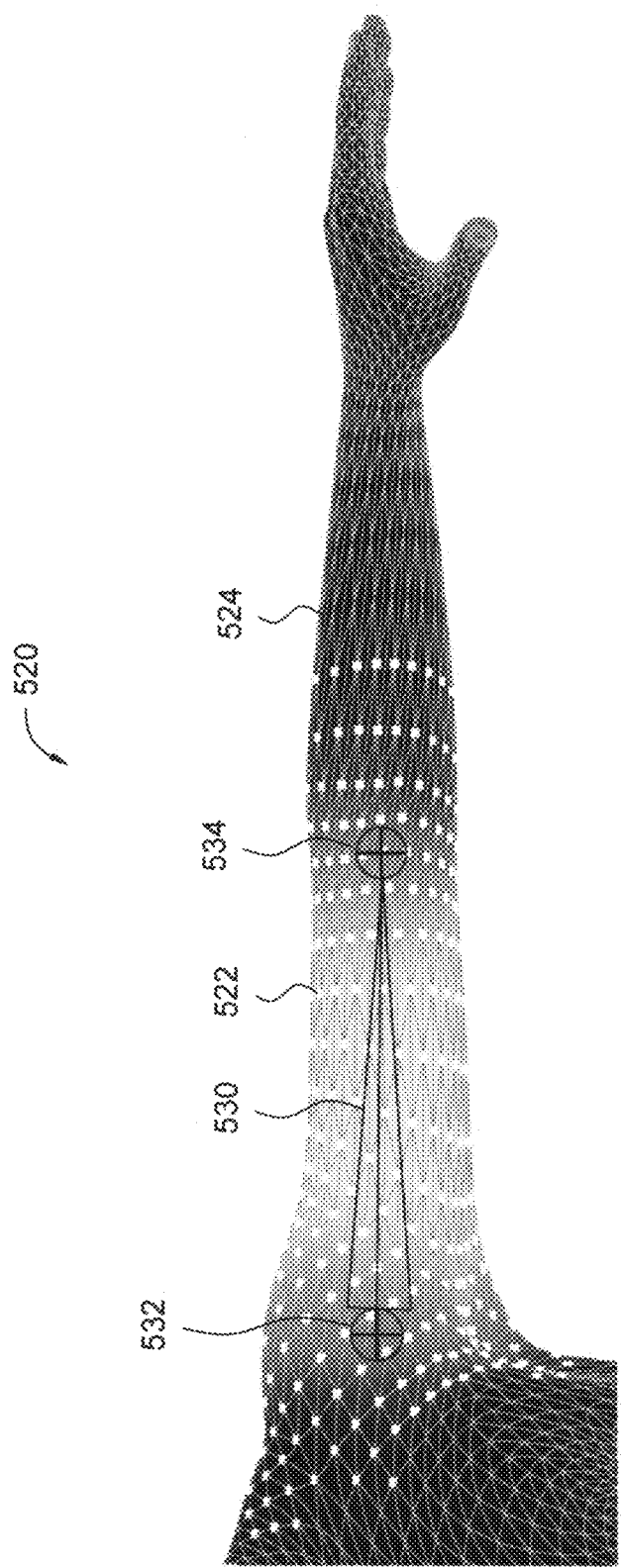
FIG. 5 illustrates a set of skinning weights associated with a mesh representation and a joint hierarchy, according to various embodiments of the present invention.

FIG. 5 illustrates a set of skinning weights associated with a mesh representation 520 and a portion of a joint hierarchy, according to various embodiments of the present invention. As shown, the mesh representation 520, illustrated in green, covers the area around the left shoulder, arm, and hand of an animated character (not explicitly shown). The portion of the joint hierarchy includes an upper arm bone 530 and associated shoulder joint 532 and elbow joint 534. Vertices included in the mesh representation 520 that are located near the upper arm bone 530, such as vertex 522, are highlighted in white, indicating that these vertices are associated with non-zero skinning weights with respect to the upper arm bone 530. Vertices included in the mesh representation 520 that are located farther away the upper arm bone 530, such as vertex 524, are not highlighted in white, indicating that these vertices are associated with skinning weights that are at or near zero with respect to the upper arm bone 530. Correspondingly, portions of the mesh representation 520 with a black background have vertices with skinning weights that are at or near zero. Portions of the mesh representation 520 with a red, orange, or yellow background have vertices with low, medium, or high skinning weights, respectively.

Figure 6:
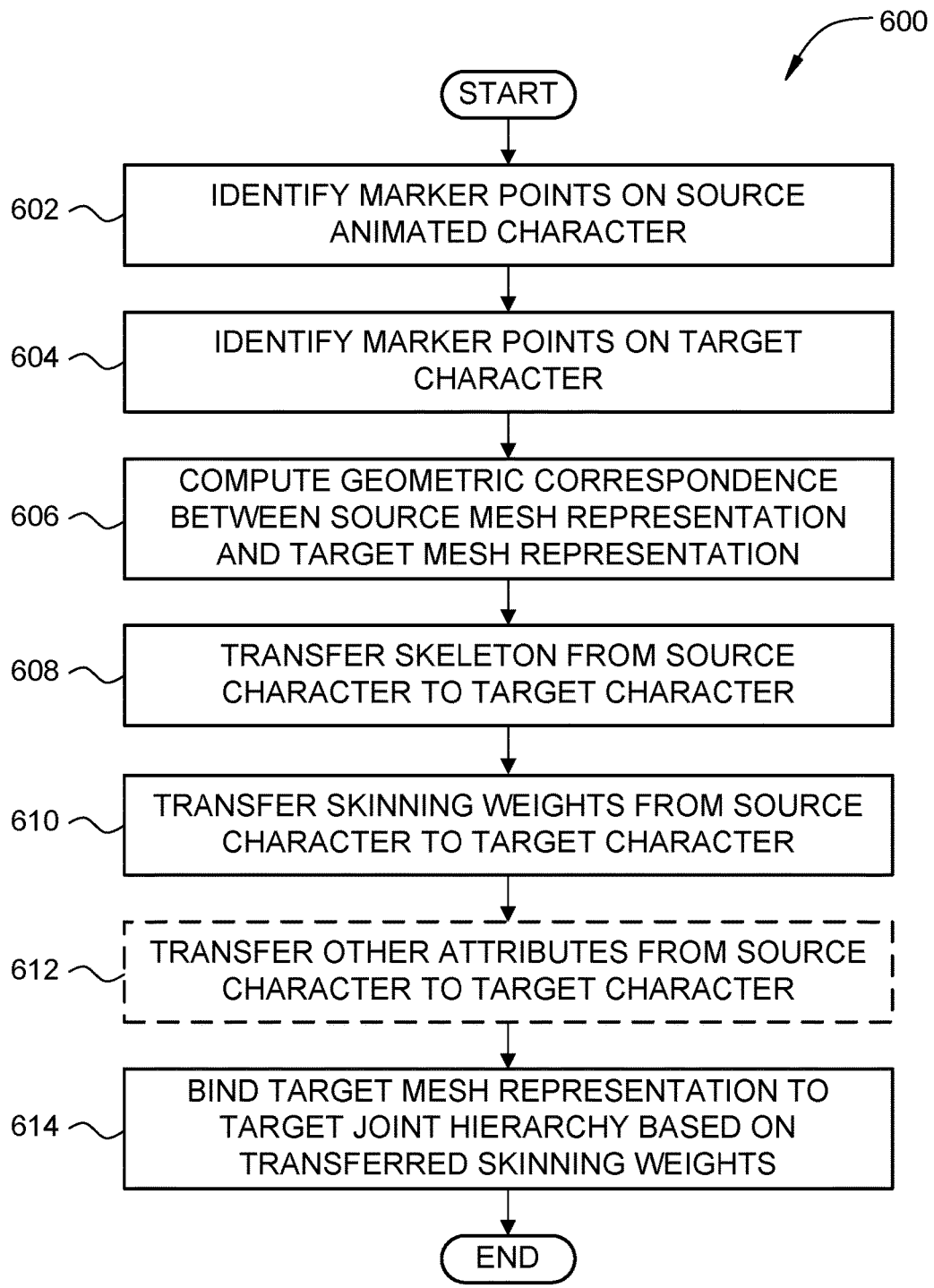
FIG. 6 is a flow diagram of method steps for transferring attributes from a source animated character to a target character, according to various embodiments of the present invention.

FIG. 6 is a flow diagram of method steps for transferring attributes from a source animated character to a target character, according to various embodiments of the present invention. Although the method steps are described in conjunction with the systems of FIGS. 1-2, persons of ordinary skill in the art will understand that any system configured to perform the method steps, in any order, is within the scope of the invention.

As shown, a method 600 begins at step 602, where a geometric correspondence engine 232 included in a character attribute transfer system 200 identifies marker points on the mesh representation associated with a source animated character. The markers may be placed manually by a computer animation artist or via an automated process. In general, markers are placed at higher densities in areas of the mesh representation that exhibit relatively complex motion and are associated with relatively complex portions of the joint hierarchy. At step 604, the geometric correspondence engine 232 identifies marker points on the mesh representation associated with a target character. The markers may be placed manually by a computer animation artist or via an automated process. Again, markers are placed at higher densities in areas of the mesh representation that exhibit relatively complex motion and are associated with relatively complex portions of the joint hierarchy.

At step 606, the geometric correspondence engine 232 computes a geometric correspondence between the source mesh representation and the target mesh representation based on the markers on each of the source mesh representation and the target mesh representation. The geometric correspondence engine 232 establishes this geometric correspondence by generating a mapping between the set of markers on the source animated character and the set of markers on the source animated character. The geometric correspondence is generated independent of differences in geometric details between the source and target mesh representations, such as the number of geometry primitives included in each mesh representation or how the mesh representation has been divided into geometry primitives.

At step 608, a skeleton transfer engine 234 included in the character attribute transfer system 200 transfers the skeleton from the source animated character to the target character based on the geometric correspondence. The skeleton transfer engine 234 calculates the target joint hierarchy via an optimization technique, while preserving the relationships between vertices in the source mesh representation and joints in the source joint hierarchy. The skeleton transfer engine 234 also performs a pose normalization procedure to ensure that joints in the target joint hierarchy and the source joint hierarchy are correctly aligned. The skeleton transfer engine 234 determines the position of the source skeleton within the target mesh representation. In so doing, the skeleton transfer engine 234 performs a two-step process by first positioning and then orienting joints, while considering the relationship among joints, vertices, and skinning weights.

At step 610, a skinning weights transfer engine 236 included in the character attribute transfer system 200 transfers the skinning weights from the source animated character to the target character based on the geometric correspondence. The skinning weights transfer engine 236 calculates the set of target skinning weights and binds or attaches the target mesh representation to the target joint hierarchy, thereby yielding a target character that is ready for animation and that preserves quality of the source character representation. In some embodiments, the skinning weights from the source animated character may be filtered based on the geometric correspondence and differences in mesh resolution between the source animated character and the target character.

At step 612, in some embodiments, additional transfer engines included in the character attribute transfer system 200 transfer other attributes from the source animated character to the target character based on the geometric correspondence. For example, transfer engines could transfer the rig control and/or (u, v) coordinates for applying textures to the animated characters. The rig control includes a set of controllers and constraints that define how an animated character can pose and move. The (u, v) coordinates define positions of one or more textures that are projected onto the mesh representation, where such textures enhance the outer appearance of the animated character. At step 614, the skinning weights transfer engine 236 binds or attaches the mesh representation associated with the target character to the joint hierarchy associated with the target character based on the transferred skinning weights. The method 600 then terminates.

In sum, the present disclosure describes a new approach for transferring an existing skeleton, skinning weights, and other attributes from a source animated character to geometric objects that define the skin of various target characters. A set of markers is identified on the mesh representation of the source animated character. Likewise, a set of markers is the mesh representation of the target character. The source mesh representation is deformed to match the target mesh representation. The point-to-point geometric correspondence between the deformed source mesh representation and the target mesh representation is determined, linking together markers with similar semantic meanings, such as the tip of the right finger and the top of the head. The skeleton of the source animated character is transferred to the target character by positioning and orienting the joints of the target character, while considering the relationship among joints, vertices, and skinning weights. The skinning weights of the source animated character are transferred to the target character. The skinning weights from the source animated character are filtered based on the geometric correspondence and differences in mesh resolution between the two animated characters. Likewise, other attributes, including rig control information and (u, v) texture coordinates are transferred from the source animated character to the target character. After the transfer process, the mesh representation is bound to or attached to the transferred skeleton based on the transferred skinning weights. The new target character is then ready for posing and animation.

At least one advantage of the disclosed techniques is that new animated characters can be created from a mesh representation without the need to create a custom joint hierarchy, rig, and set of skinning weights for the new animated character. The joint hierarchy, rig, and set of skinning weights from an existing animated character to the new animated character without placing constraints on the design of the mesh representation of the new animated character. These techniques avoid the need to create the skeleton and skinning weights for the new animated character from scratch, a process that can be tedious and require time-consuming manual adjustments. The disclosed approach eliminates typical modeling constraints by handling characters with meshes of various topologies and morphologies. The time and effort to generate a new animated character is reduced relative to prior approaches, and the computer animation artist can design the appearance of the new animated character without undue limits on artistic freedom.

Another advantage of the disclosed techniques is that further adjustments can be made to the skinning weights of the source animated character to correct or modify the animated character. The adjusted skinning weights can be transferred to the target characters, thereby propagating the adjusted skinning weights to the relevant target.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for transferring attributes from a source animated character to a target character, comprising:
   identifying a first set of markers on a source mesh representation of the source animated character;
   identifying a second set of markers on a target mesh representation of the target character;
   determining a first joint-vertices relationship between a portion of the first set of markers and a first location of a first joint included in a first joint hierarchy associated with the source animated character;
   generating a geometric correspondence between the first set of markers and the second set of markers, wherein the geometric correspondence is independent of differences in geometry between the source animated character and the target character; and
   transferring, based on both the geometric correspondence and the first joint-vertices relationship, the first location of the first joint from the source animated character to the target character.

2. The method of claim 1, further comprising performing a pose normalization process on the source animated character to align the first joint hierarchy with a second joint hierarchy associated with the target character.

3. The method of claim 1, wherein transferring the first location comprises:
   determining the first location;
   computing a second location for a second joint included in a second joint hierarchy associated with the target character based on both the first location and the geometric correspondence; and
   placing the second joint at the second location.

4. The method of claim 1, further comprising:
   determining a first rotation angle of the first joint; and
   computing, based on the first rotation angle, a second rotation angle for a second joint included in a second joint hierarchy associated with the target character.

5. The method of claim 1, further comprising:
   determining a first set of one or more skinning weights associated with the source mesh representation;
   computing, based on both the first set of one or more skinning weights and the geometric correspondence, a second set of one or more skinning weights associated with the target mesh representation; and
   attaching, based on the second set of one or more skinning weights, a first vertex included in the target mesh representation to a second joint hierarchy associated with the target character.

6. The method of claim 1, further comprising:
   determining that a first resolution of the source mesh representation is less than a second resolution of the target mesh representation;
   performing a linear interpolation on a first subset of skinning weights included in a first set of skinning weights associated with the source mesh representation to generate a set of resampled source skinning weights; and
   determining a first target skinning weight associated with the target character, based on at least one of the set of resampled source skinning weights.

7. The method of claim 1, further comprising:
   determining that a first resolution of the source mesh representation is greater than a second resolution of the target mesh representation;
   selecting one or more vertices included in the source mesh representation;
   applying a filter to a plurality of source skinning weights associated with the one or more vertices to generate a filtered skinning weight; and
   assigning the filtered skinning weight to a first vertex included in the target mesh representation.

8. The method of claim 1, and further comprising:
   after transferring a first set of one or more skinning weights associated with the source animated character to the target character, determining that a first skinning weight included in the first set of one or more skinning weights has changed; and transferring the first skinning weight from the source animated character to the target character based on the geometric correspondence.

9. The method of claim 1, further comprising transferring a rig control from the source animated character to the target character, wherein the rig control includes a set of controllers and one or more constraints that define how the source animated character can pose and move.

10. The method of claim 1, further comprising transferring a set of (u, v) coordinates from the source animated character to the target character, wherein the set of (u, v) coordinates defines positions of one or more textures that are projected onto the source mesh representation.

11. One or more non-transitory computer-readable storage media including instructions that, when executed by one or more processors, cause the one or more processors to transfer attributes from a source animated character to a target character by performing the steps of:
identifying a first set of markers on a source mesh representation of the source animated character;
identifying a second set of markers on a target mesh representation of the target character;
determining a first joint-vertices relationship between a portion of the first set of makers and a first location of a first joint included in a first joint hierarchy associated with the source animated character;
generating a geometric correspondence between the first set of markers and the second set of markers, wherein the geometric correspondence is independent of differences in geometry between the source animated character and the target character; and
transferring, based on both the geometric correspondence and the first joint-vertices relationship, the first location of the first joint from the source animated character to the target character.

12. The non-transitory computer-readable storage media of claim 11, further comprising performing a pose normalization process on the source animated character to align the first joint hierarchy with a second joint hierarchy associated with the target character.

13. The non-transitory computer-readable storage media of claim 11, wherein transferring the first location comprises:
determining the first location;
computing a second location for a second joint included in a second joint hierarchy associated with the target character based on the first location and the geometric correspondence; and
placing the second joint at the second location.

14. The non-transitory computer-readable storage media of claim 11, further comprising:

determining a first rotation angle of the first joint; and
computing, based on the first rotation angle, a second rotation angle for a second joint included in a second joint hierarchy associated with the target character.

15. The non-transitory computer-readable storage media of claim 11, wherein generating the geometric correspondence further comprises deforming the source mesh representation to generate a deformed source mesh representation that matches the target mesh representation.

16. The non-transitory computer-readable storage media of claim 15, wherein generating the geometric correspondence further comprises extracting a dense correspondence based on closest locations between the deformed source mesh representation and the target mesh representation.

17. The non-transitory computer-readable storage media of claim 15, wherein each vertex included in the deformed source mesh representation is bijectively linked to a barycentric coordinate on a polygon of the target mesh representation.

18. The non-transitory computer-readable storage media of claim 15, wherein each vertex included in the target mesh representation is bijectively linked to a barycentric coordinate on a polygon of the deformed source mesh representation.

19. A system, comprising:
a processor; and
a memory coupled to the processor and including a geometric correspondence engine and a transfer engine;
wherein, when executing the geometric correspondence engine, the processor is configured to:
identify a first set of markers on a source mesh representation of a source animated character,
identify a second set of markers on a target mesh representation of a target character, and
determine a first joint-vertices relationship between a portion of the first set of markers and a first location of a first joint included in a first joint hierarchy associated with the source animated character;
generate a geometric correspondence between the first set of markers and the second set of markers, wherein the geometric correspondence is independent of differences in geometry between the source animated character and the target character; and
wherein, when executing the transfer engine, the processor is configured to transfer, based on both the geometric correspondence and a first joint-vertices relationship, the first location of the first joint from the source animated character to the target character.

20. The system of claim 19, wherein the geometric correspondence is generated independent of a first number of geometry primitives included in the source mesh representation relative to a second number of geometry primitives included in the target mesh representation.

* * * * *

UNITED STATES PATENT AND TRADEMARK OFFICE
CERTIFICATE OF CORRECTION

Page 1 of 2

PATENT NO. : 10,489,956 B2
APPLICATION NO. : 14/999985
DATED : November 26, 2019
INVENTOR(S) : Olivier Dionne et al.

It is certified that error appears in the above-identified patent and that said Letters Patent is hereby corrected as shown below:

On the Title Page

Page 2, (56) Other Publications, Column 1, Lines 5, 6, 7, 8:
Please delete "Allen, Brett, Brian Curless, and Zoran Popovit. "The space of human body shapes: reconstruction and parameterization from range scans." In ACM transactions on graphics (TOG), vol. 22, No. 3, pp. 587-594. ACM, 2003." and insert --Allen, Brett, Brian Curless, and Zoran Popović. "The space of human body shapes: reconstruction and parameterization from range scans." In ACM transactions on graphics (TOG), vol. 22, No. 3, pp. 587-594. ACM, 2003.--;

Page 2, (56) Other Publications, Column 1, Lines 12, 13, 14:
Please delete "Baran, Ilya, and Jovan Popovio. "Automatic rigging and animation of 3d characters." in ACM Transactions on Graphics (TOG), vol. 26, No. 3, p. 72. ACM, 2007." and insert --Baran, Ilya, and Jovan Popović. "Automatic rigging and animation of 3d characters." in ACM Transactions on Graphics (TOG), vol. 26, No. 3, p. 72. ACM, 2007.--;

Page 2, (56) Other Publications, Column 1, Lines 15, 16, 17, 18:
Please delete "Borosán, Peter, Ming Jin, Doug DeCarlo, Yotam Gingold, and Andrew Nealen, "Rigmesh: automatic rigging for part-based shape modeling and deformation." ACM Transactions on Graphics (TOG) 31, No. 6 (2012): 198." and insert --Borosán, Péter, Ming Jin, Doug DeCarlo, Yotam Gingold, and Andrew Nealen, "Rigmesh: automatic rigging for part-based shape modeling and deformation." ACM Transactions on Graphics (TOG) 31, No. 6 (2012): 198.--;

Page 2, (56) Other Publications, Column 2, Lines, 30, 31, 32:
Please delete "Orvalho, Verönica, Pedro Basics, Frederic I. Parke, Bruno Oliveira, and Xenxo Alvarez." A Facial Rigging Survey." In Eurographics (STARs), pp. 183-204. 2012." and insert --Orvalho, Verónica, Pedro Basics, Frederic I. Parke, Bruno Oliveira, and Xenxo Alvarez." A Facial Rigging Survey." In Eurographics (STARS), pp. 183-204. 2012.--;

Signed and Sealed this
Twenty-eighth Day of January, 2020

Andrei Iancu
*Director of the United States Patent and Trademark Office*

CERTIFICATE OF CORRECTION (continued)
U.S. Pat. No. 10,489,956 B2

Page 2, (56) Other Publications, Column 2, Lines 52, 53, 54, 55, 56:
Please delete "Vailant, Rodolphe, Loïc Barthe, Gaël Guennebaud, Marie-Paule Cani, Damien Rohmer, Brian Wyvill, Oliver Gourmel, and Mathias Paulin. "Implicit skinning: real-time skin deformation with contact modeling." ACM Transactions on Graphics (TOG) 32, No. 4 (2013): 125." and insert -- Vailant, Rodolphe, Loïc Barthe, Gaël Guennebaud, Marie-Paule Cani, Damien Rohmer, Brian Wyvill, Oliver Gourmel, and Mathias Paulin. "Implicit skinning: real-time skin deformation with contact modeling." ACM Transactions on Graphics (TOG) 32, No. 4 (2013): 125.--.